United States Patent [19]
Shepherd

[11] 4,451,024
[45] May 29, 1984

[54] FELLING WEDGE

[76] Inventor: Larry M. Shepherd, P.O. Box 332, Grants Pass, Oreg. 97526

[21] Appl. No.: 436,184

[22] Filed: Jan. 13, 1983

[51] Int. Cl.³ .............................................. B26F 3/18
[52] U.S. Cl. ................................ 254/104; 144/193 D
[58] Field of Search .......... 144/193 R, 193 C, 193 D; 254/104

[56] References Cited
U.S. PATENT DOCUMENTS 188,376  3/1877  Kelly .................................... 254/104
3,185,442  5/1965  Hemphill ............................ 254/104

Primary Examiner—W. D. Bray
Attorney, Agent, or Firm—Robert L. Harrington

[57] ABSTRACT

A felling wedge comprising a main body portion of plastic material and a cap of hard metal material. The cap is secured to the plastic by a stud which depends from the cap and is embedded in the plastic. The cap is designed to receive the impact blows of a driving mall whereas the plastic body portion is designed to receive the bite of a cutting chain without undully dulling the cutting edges thereof.

7 Claims, 4 Drawing Figures

FELLING WEDGE

BACKGROUND OF INVENTION

This invention relates to a wedge used in conjunction with a chain saw for felling or bucking trees.

In the process of cutting down a large tree (felling) or cutting the fallen tree into designated lengths (bucking) it is not uncommon for the kerf that is being cut by the saw to slightly collapse during cutting. When this occurs, the cutting portion of the saw that is in the kerf is pinched between the sections of the tree. Getting the pinched saw out of the kerf can be difficult and the cutting chain and guide bar of the saw can be damaged.

A solution to the pinched saw problem is the felling wedge. When the depth of cut exceeds the width of the chain and bar, the point of the felling wedge is inserted into the kerf behind the chain and bar. As cutting continues, the wedge is periodically driven into the kerf to prevent collapsing. The wedge in fact will spread the kerf to insure free cutting.

An alternate use of the felling wedge is to control the direction of fall of the tree. Techniques are used to direct the fall of the tree but on occasion, such techniques are not sufficient, e.g., when a tree is leaning away from the direction where felling is desired. In such instances the wedge will assist in "lifting" the tree in the direction desired.

Because considerable forces are exerted on the wedge, the material from which it is made is required to be tough. However, this material must also be of a consistency that allows it to be easily cut by the cutting chain. It is quite common for the cutting chain of the chain saw to contact the wedge during the cutting operation. The cutting edges of the saw chain are specifically designed to cut wood and even the slightest contact with a hard material such as metal will instantly dull the cutting edges of the entire chain. It is far better to slightly damage the wedge than to dull the saw chain.

It is very common to produce the wedges out of molded plastic. A suitable plastic wedge is described in the U.S. Pat. No. 3,185,442. Such plastic is tough enough to be wedged into a kerf of a large tree, but is easily cut by a saw chain cutter without significant dulling. The problem with the plastic wedge is that it is quite easily damaged by the pounding of a driving mall. The striking force of the mall against the butt end of the wedge will cause splaying of the end and creates a rim of the material that projects outwardly from the side of the wedge. Whereas it is often desirable to drive the wedge as far into the cut as possible, when the rim is formed at the butt end it functions to limit the penetration, i.e., when the rim is brought flush up against the tree. A further problem is created by miss hits of the driving mall. In the same manner that the wedge can be cut by the cutting chain, when an axe or mall does not hit the butt end squarely, i.e., when it catches a corner of the wedge, the wedge is chipped and repeated miss hits quickly damages the wedge beyond use. The conditions just described insures a short life for the wedge.

SUMMARY OF INVENTION

The device of the present invention obviates the problems just described by providing a hard metal cap that forms the butt end of the wedge. In the preferred embodiment, a pair of metal studs depend from one side of the cap and these studs are projected into the plastic of the main body portion of the wedge. Holes are provided in the studs and the plastic in molten form, e.g., when being cast, flows around the studs and through the holes to tightly secure the metal cap to the plastic. A further preferred modification is the provision of a head portion that encompasses the metal cap. The sides of the head portion are inset from the flared sides of the main body portion. As the head portion is driven into the kerf, the metal cap will thus easily pass into the kerf opening.

DETAILED DESCRIPTION INCLUDING DRAWINGS

Having thus briefly described the preferred embodiment of the invention, a more detailed description of the invention is provided hereafter, including drawings wherein.

Figure 1:
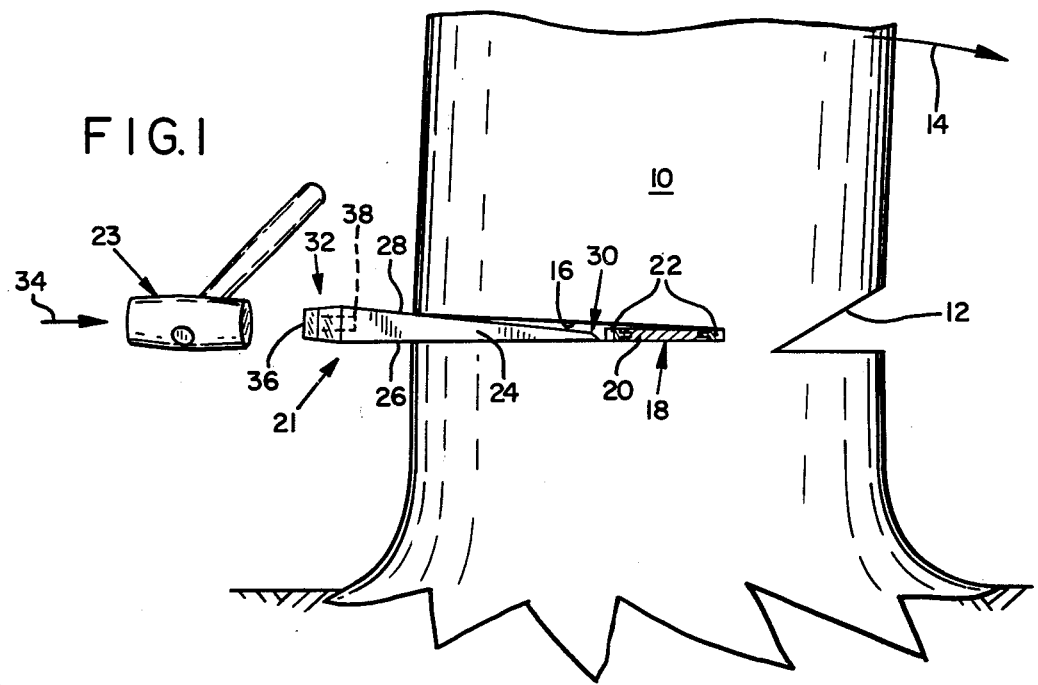
FIG. 1 is a view of a felling wedge, of the present invention, being driven into the kerf of a tree being felled.

Referring to FIG. 1 of the drawings, a tree 10 is being felled in a conventional manner. A notch 12 has been formed in the side of the tree to establish the direction in which the tree is to be felled (illustrated by arrow 14). A kerf 16 is being cut into the tree by a chain saw 18 (only a cross-section of the guidebar 20 and cutting chain 22 of the chain saw is shown).

In that the chain saw 18 has fully entered the kerf 16 being formed in the tree 10, a felling wedge 21 of this invention is being driven into the kerf 16 by a driving mall 23. The felling wedge 21 is more clearly shown in FIG. 2. The main body portion 24 is produced from a suitable plastic material as by molding. The material is tough whereby it resists compression. The sides 26 and 28 are slightly flared from the narrow end 30 and as the wedge is driven into the kerf, a slight spreading of the kerf is achieved. This provides clearance for the chain saw and allows the saw chain to run more freely. The sides 26 and 28 are also preferably of rough consistency for gripping the kerf walls so that the wedge will not pop back out of the kerf.

Referring again to FIG. 1, a typical situation is shown i.e., where the wedge is driven into a closely adjacent position relative to the cutting chain 22 of a chain saw. It will be appreciated that angular adjustment of the saw or simply backing the saw up for any one of a number of reasons will cause the fast running saw chain to contact the wedge. The chain runs at such a high speed that in an instant, all the cutters of the chain will have taken a "bite" out of the wedge. A properly sharpened saw chain is very important and considerable time and effort goes into maintaining the chain. An abrasive or hard material, like metal, when contacted by the chain will instantly dull the cutters to where it will cut only at a fraction of its prior efficiency. Relative to the cutting efficiency of the chain, wear life of the wedge is a constant concern to the logger. Thus, care is taken to insure that the material of the wedge has a minimal effect on the saw chain when it is inadvertently brought into contact with the wedge.

FIG. 1 also illustrates the severe pounding that is imposed on the butt end 32 of the wedge. It will be appreciated that driving the wedge 21 into the kerf requires a great amount of force. This is typically achieved by striking the butt end 32 of the wedge with the heavy mall 23 as illustrated by directional arrow 34. The plastic material of the main body portion of the wedge 24, as compromised to minimize damage to the cutting chain, does not stand up well to such pounding. A cap 36 is thus provided to receive the striking force of the mall 23.

Figure 2:
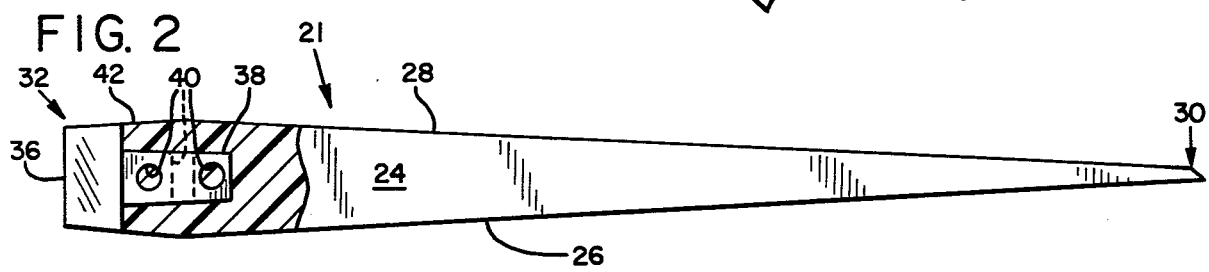
FIG. 2 is an enlarged view of the felling wedge with a portion cross sectioned to illustrate the interconnection of the two components of the wedge.
Figure 3:
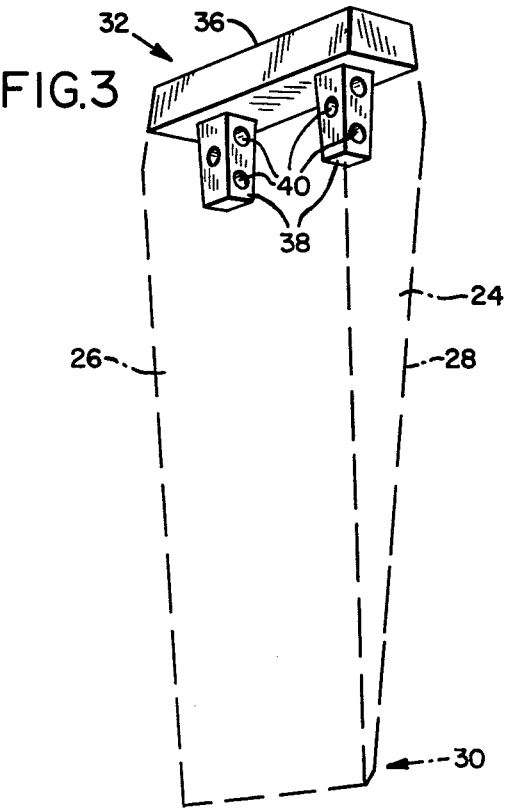
FIG. 3 is a persepective view of the cap of the wedge with the main body portion shown in dashed lines.

Referring to FIGS. 2 and 3, the cap 36 is constructed of hard metal material, e.g., hardened steel. A suitable thickness is for example ¼ inch. The planar dimension is in accordance with the base dimensions of the main body portion, e.g., 1¼ inch by 3¼ inch. A pair of lugs 38, integral with the cap 36, extend from the inner or under side of the cap and are embedded in the plastic of the main body portion 24. Preferably such embedding is accomplished at the time the main body portion 24 is molded. Thus the lugs 38 are inserted into the molten plastic and the plastic flows around the lugs and into the openings 40. When the plastic sets, the cap is securely held to the main body portion and the only way it will get removed is by tearing a section of the plastic loose. An alternative method of securing the cap to the plastic is to provide a threaded bolt shank in place of the lugs shown in FIGS. 2 and 3. Holes are drilled into the hardened plastic just big enough to accommodate the bolt shanks. The bolt shanks are heated and then quickly placed into the holes. The heat of the bolt melts the plastic, causing it to flow between the threads. On cooling, the cap is secured to the plastic.

Figure 4:
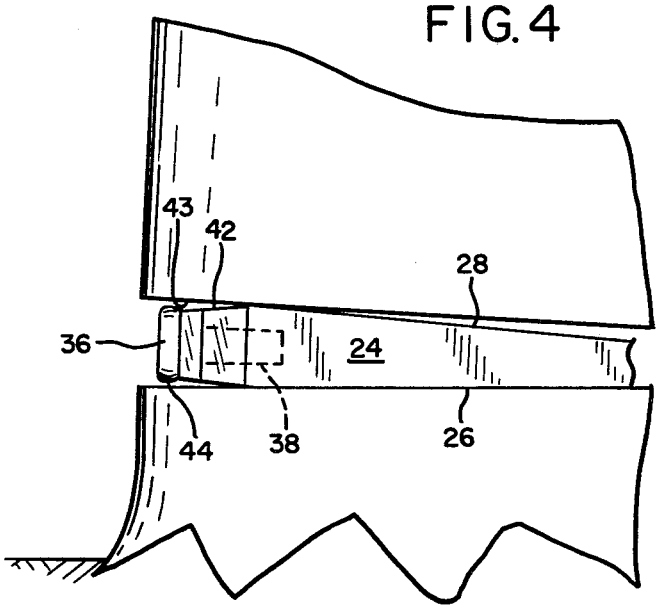
FIG. 4 is a view of the felling wedge driven all the way into the kerf of a tree.

Referring now to FIG. 4, it will be noted that sides 26 and 28 are slightly angles inwardly at the start of the head portion. The significance of this in-setting of the sides is that a clearance 43 is created between the head portion 42 at its outer end and the kerf walls (that is when the wedge is buried into the kerf as shown). Thus a rim 44 which may be created by the extreme pounding of the mall against the hard metal cap 36 will slip past the kerf walls to the extent that the rim 44 does not exceed the clearance 43.

The above described invention is believed to provide a significant improvement in felling wedges. The utility of the wedge is greatly improved and the life is extended far beyond that of conventional wedges. Furthermore, it is believed that the wedge is more easily driven by reason of the solid impact achieved by the driving mall striking the solid metal cap rather than the softer material of the plastic body portion. Others skilled in the art, upon acquiring the information of this disclosure, will be able to modify and perhaps improve on the invention. It is to be understood, however, that such modifications are encompassed within the invention as specifically defined and set forth in the appended claims.

I claim:

1. A felling wedge for use in conjunction with a cutting saw in felling and bucking trees comprising: a main body portion having a narrow end and a butt end defining a planar surface of a determined dimension and sides that diverge from the narrow end to the butt end, and a cap having a planar surface of said determined dimension and a lug depending therefrom, said planar surfaces of the butt end and cap being in superimposed abuttment with said lug being embedded in the main body portion at the butt end thereof to permanently secure the cap to the butt end of the main body portion, said main body portion constructed of a material softer than the material of the cap whereby the main body portion is relatively more compatible to being cut by the chain saw and the cap is relatively more compatible to being struck by a driving mall.

2. A felling wedge as defined in claim 1 wherein the main body portion is constructed of a tough moldable plastic and the cap is constructed of a hard metal.

3. A felling wedge as defined in claim 1 wherein a head portion is formed at the butt end of the wedge, said head portion comprising sides that are inset from said diverging sides, and the cap being confined within the inset sides whereby the kerf walls of the tree being cut are held apart by the diverging sides of the wedge and thereby spaced from the inset sides of the head portion of the cap.

4. A felling wedge as defined in claim 2 wherein the cap is constructed of hardened steel.

5. A felling wedge as defined in claim 4 wherein the lug is provided with a multiple of holes and the lug is embedded in the plastic while in molten form whereby fingers of plastic material pass through the lug openings upon setting up to firmly secure the cap to the main body portion.

6. A felling wedge as defined in claim 4 wherein the lug is a threaded bolt that is embedded in the plastic by providing a close fitting hole in the plastic and heating the bolt just prior to inserting it into the hole so as to heat and melt the plastic, causing it to flow into the threads of the bolt and thereby secure the cap to the main body portion upon cooling.

7. A felling wedge as defined in claim 4 wherein the thickness of the steel cap is at least a quarter inch and the planar dimensions are mated to the corresponding dimensions of the butt end of the main body portion.

* * * * *